(12) United States Patent
Shen et al.

(10) Patent No.: US 11,483,913 B2
(45) Date of Patent: Oct. 25, 2022

(54) ENVIRONMENTAL CONTROL SYSTEM AND METHOD FOR SIMULATING CIRCADIAN RHYTHMS

(71) Applicant: HAMPTON PRODUCTS INTERNATIONAL CORPORATION, Foothill Ranch, CA (US)

(72) Inventors: Howard Shen, Mission Viejo, CA (US); Kyrilous Basilious, Corona, CA (US); Jon Fong Quan, Fountain Valley, CA (US)

(73) Assignee: Hampton Products International Corporation, Foothill Ranch, CA (US)

(*) Notice: Subject to any disclaimer, the term of this patent is extended or adjusted under 35 U.S.C. 154(b) by 0 days.

(21) Appl. No.: 17/324,934

(22) Filed: May 19, 2021

(65) Prior Publication Data
US 2021/0410252 A1 Dec. 30, 2021

Related U.S. Application Data

(60) Provisional application No. 63/045,750, filed on Jun. 29, 2020.

(51) Int. Cl.
| | |
|---|---|
| *H05B 47/11* | (2020.01) |
| *H05B 47/16* | (2020.01) |
| *H05B 45/22* | (2020.01) |
| *H05B 47/19* | (2020.01) |

(52) U.S. Cl.
CPC .......... *H05B 47/11* (2020.01); *H05B 45/22* (2020.01); *H05B 47/16* (2020.01); *H05B 47/19* (2020.01)

(58) Field of Classification Search
CPC ........ H05B 45/20; H05B 45/22; H05B 47/10; H05B 47/11; H05B 47/16; H05B 47/19
See application file for complete search history.

(56) References Cited

U.S. PATENT DOCUMENTS

| | | |
|---|---|---|
| 9,974,973 B2 | 5/2018 | Maxik et al. |
| 10,022,556 B1 | 7/2018 | Holbert et al. |
| 10,278,252 B2 | 4/2019 | Li et al. |
| 10,324,250 B2 | 6/2019 | Krames et al. |
| 10,471,231 B2 | 11/2019 | Moore-Ede et al. |
| 10,475,363 B2 | 11/2019 | Chen et al. |
| 10,485,070 B2 | 11/2019 | Chen et al. |
| 10,595,376 B2 | 3/2020 | Soler et al. |
| 10,603,507 B2 | 3/2020 | Brainard et al. |
| 10,605,970 B2 | 3/2020 | Blair et al. |
| 10,609,798 B1 | 3/2020 | Maa et al. |
| 2010/0029268 A1* | 2/2010 | Myer .................. F21V 14/02 340/521 |
| 2016/0295658 A1* | 10/2016 | Chraibi ................ F21V 19/006 |

* cited by examiner

*Primary Examiner* — Jimmy T Vu
(74) *Attorney, Agent, or Firm* — KOS IP Law LLP

(57) ABSTRACT

An environmental control is configured to control lighting and/or other environmental parameters of an indoor space so that such parameters simulate measured outdoor environmental parameters. One or more sensors, such as a lighting sensor, can be mounted outdoor. Parameters measured by the sensor are communicated to a controller, which in turn controls one or more luminaires in the indoor space to simulate the actual outdoor light. In some instances the controller is configured to modulate the simulation to conform to user-defined preferences.

13 Claims, 3 Drawing Sheets

ENVIRONMENTAL CONTROL SYSTEM AND METHOD FOR SIMULATING CIRCADIAN RHYTHMS

CROSS-REFERENCE TO RELATED APPLICATIONS

The application claims the benefit of U.S. Provisional Application No. 63/045,750, which was filed on Jun. 29, 2020, the entirety of which is hereby incorporated by reference.

BACKGROUND

The present disclosure relates to the field of environmental control systems.

Humans and most other living things exhibit physical, mental, and behavioral changes in response to the presence or absence of light in the surrounding environment. Such changes also respond to the qualities, or parameters, of such light when present, and how such qualities of light change over a 24-hour daily cycle. These changes, known as circadian rhythms, can influence sleep/wake cycles and other important bodily functions. For example, when a human's eyes take in less light at night, the brain triggers increased production of melatonin, especially when such lower light levels are combined with a decreased saturation of light in the blue wavelengths (about 400-495 nm). In contrast, high light levels, including relatively high levels of light in the blue wavelengths, trigger suppression of melatonin.

Indoor living can be disruptive to circadian rhythms. Conventional lighting sources tend to remain constant with regard to the qualities of light emitted thereby. This may interrupt the natural circadian cycle of an individual. Such interruption of the circadian cycle can be associated with short and long-term health effects.

Systems exist for using artificial light to simulate day cycles to, for example, attempt to manipulate a person's circadian rhythms. This can be done, for example, in an attempt to make up for jet lag, to simulate a daily cycle for astronauts or blind individuals, or the like. However, such systems tend to be based on prearranged timing and operate independent of real-time natural light-level changes.

SUMMARY

The present specification provides a lighting and environmental control system that provides illumination and/or environmental controls (such as HVAC) that are based on natural, outdoor light and environmental parameters as measured by one or more sensors.

In accordance with an embodiment the present specification provides a system, comprising a sensor apparatus placed in an indoor or outdoor location and configured to detect one or more natural outdoor light parameters. At least one luminaire is configured to emit light, the at least one luminaire being placed in an indoor space and configured so that at least one of a color and an intensity of the emitted light can be adjusted. The color can refer to color temperature, RGB color value, wavelength, and/or any properties of color. A controller is configured to receive a sensor data comprising information about the at least one natural outdoor light parameter as detected by the sensor apparatus. The controller is configured to selectively adjust the color and/or intensity of emitted light from the luminaire. A communication apparatus is configured to communicate the sensor data concerning the natural outdoor light parameters to the controller. The controller is configured to adjust the color and/or intensity of emitted light from the luminaire based on the data concerning the natural outdoor light parameters.

In an additional embodiment the luminaire controller is configured to adjust the color and/or intensity of emitted light from the luminaire to mimic the natural outdoor light parameters.

In a further embodiment, the sensor apparatus is configured to detect at least one outdoor environmental condition other than light, and wherein the controller is configured to receive a data concerning the at least one outdoor environmental condition and to control an indoor environmental condition apparatus based on the data concerning the at least one outdoor environmental condition.

In accordance with another embodiment, the present specification provides a method of performing environmental control of an indoor space. The method includes detecting one or more natural outdoor light parameters, saving a sensor data concerning the detected one or more natural outdoor light parameters, and developing a control routine based on the sensor data. The control routine is configured to control one or more luminaires within the indoor space so that one or more indoor space light parameters in the indoor space mimic the detected one or more natural outdoor light parameters. The method further includes repeatedly updating the sensor data and control routine over time as the one or more natural outdoor light parameters change so that the one or more indoor space light parameters correspondingly change.

Some such embodiments additionally comprise receiving and saving one or more user preferences, and the control routine is configured to control the one or more luminaires within the indoor space so that the one or more indoor space light parameters in the indoor space mimic the detected one or more natural outdoor light parameters subject to the user preferences.

A further embodiment additionally comprises maintaining the one or more indoor space light parameters at a selected setting for an offset period of time. Some such embodiments additionally comprise, after the offset period of time passes, controlling the one or more luminaires so that the one or more indoor space light parameters in the indoor space mimic the one or more natural outdoor light parameters detected an offset period of time prior.

In additional embodiments, the one or more luminaires is controlled to maintain light intensity within the indoor space above a minimum level when actuated notwithstanding the contemporaneously detected natural outdoor light intensity. Some embodiments additionally comprise controlling the one or more luminaires so that the blue saturation within the indoor space mimics the contemporaneously detected natural outdoor blue saturation.

DESCRIPTION

The present specification provides a lighting and environmental control system that provides illumination and/or environmental controls (such as HVAC) that are based on natural, outdoor light and environmental parameters as measured by one or more sensors.

Figure 1:
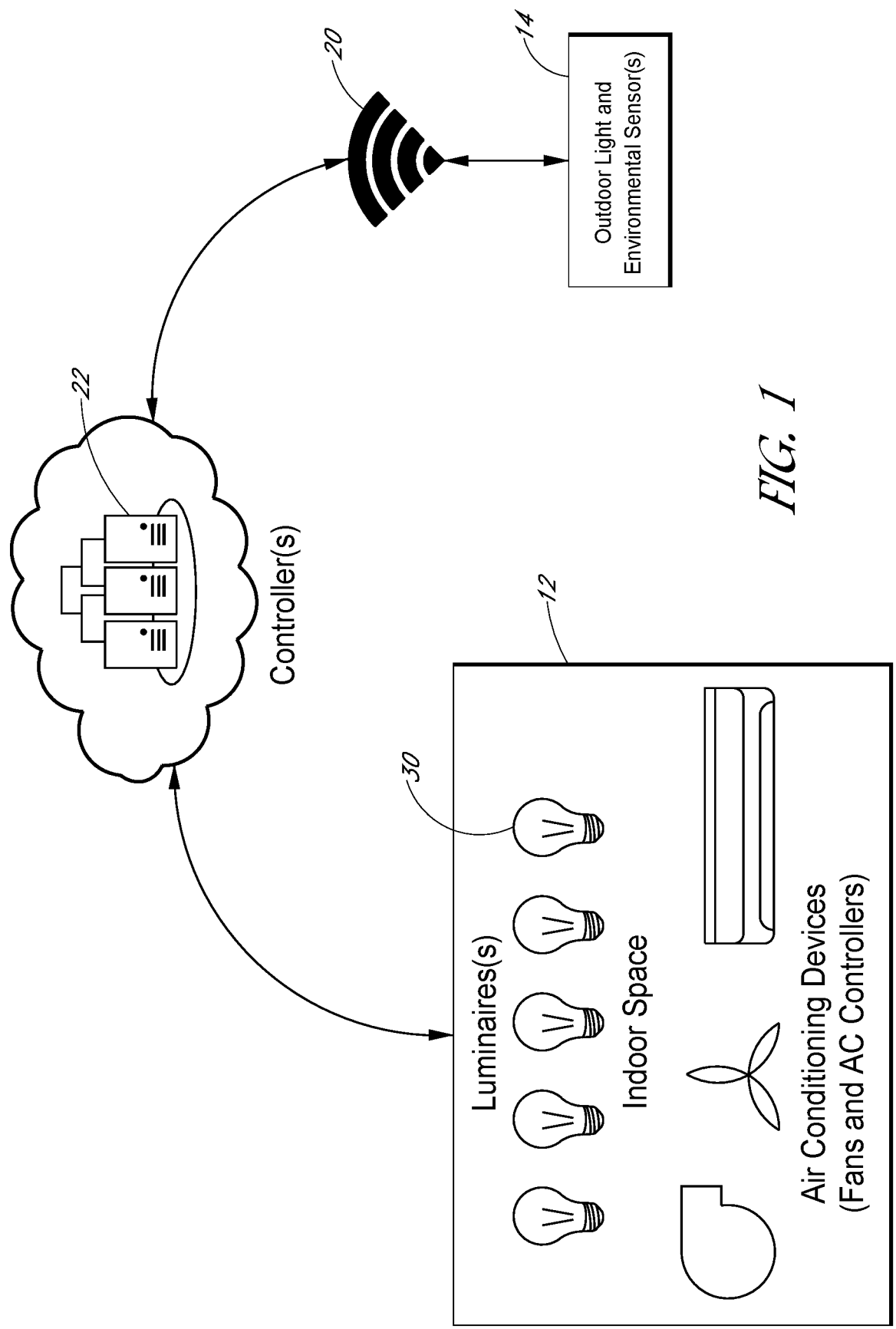
FIG. 1 is a schematic view in accordance with an embodiment.
Figure 2:
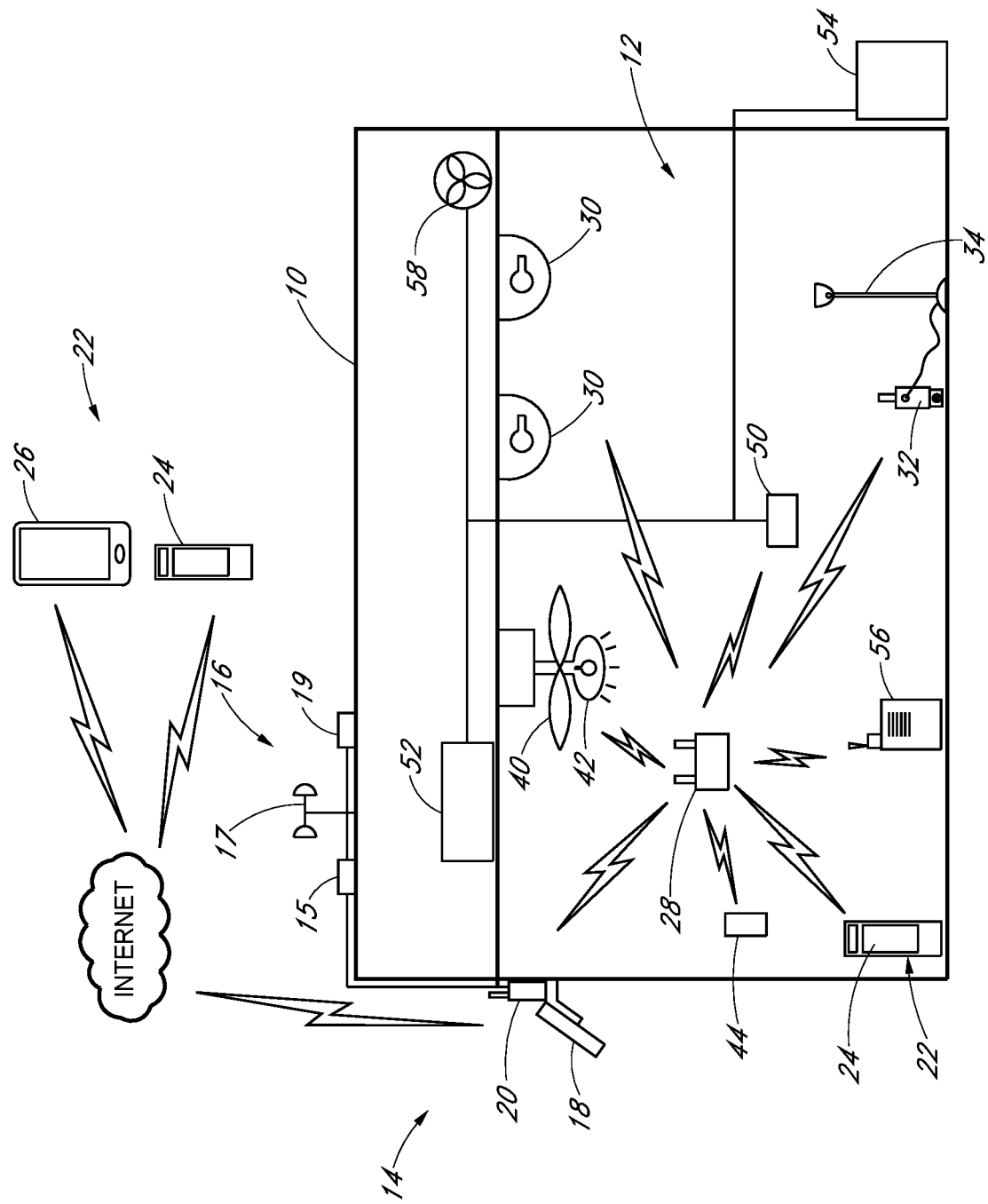
FIG. 2 is another schematic view illustrating aspects of multiple embodiments.

With initial reference to FIGS. 1 and 2, structure 10 such as a residential or commercial building defines one or more indoor spaces 12, which can be defined as a room or group of rooms. A sensor apparatus 14 placed indoors or outdoors detects natural outdoor environmental parameters. Such measured parameters can include various qualities and aspects of natural light, such as color (such as RGB wavelength distribution and RGB color value), light temperature (such as measured in Kelvin) and intensity (such as measured in Lux). Other environmental parameters, such as temperature or humidity, can also be detected. One or more sensors 16, or even an array of sensors placed in multiple, spaced apart locations, can be employed to obtain measurements of such parameters. Example sensors 16 can include light sensors 15, wind speed sensors 17, and other sensors 19 to measure aspects such as humidity, sound, scents, or other environmental aspects. Most preferably, such measurements will be gathered substantially continuously, so that as such parameters change over the course of the daily cycle, accurate data concerning such changing parameters will be obtained by the sensor apparatus 14.

The sensor apparatus 14 may be powered by a conventional wired, AC connection. More preferably the sensor apparatus 14 is battery-powered. Still more preferably, the sensor apparatus 14 is powered by a renewable energy source, such as a photovoltaic panel 18 and/or wind turbine, which charges the battery.

Preferably, the sensor apparatus 14 includes a communications apparatus 20 configured to communicate sensor readings to a computing device 22 having a processor. Preferably such communication is via a wireless means, although wired communication is also contemplated. In some embodiments, the communications apparatus 20 includes a processor configured to convert sensor readings into a data format that is more readily usable by other electronic devices. The computing device (or devices) 22 to which sensor readings are communicated can take any of many forms. For example, the computing device 22 can comprise a remote or local server 24, desktop or laptop computer, tablet, wireless phone 26 or the like, and can also comprise further communication apparatus, such as a wireless (e.g., Wi-Fi®) router 28 and/or wireless mesh system, other wireless or wired local area networks, cellular and/or satellite communication networks, or the like. Further, computing devices 22 can include any of various controllers associated with so-called "smart" devices such as luminaires 30 (including light fixtures and sometimes individual bulbs having controllers), Internet-of-Things (IoT)-enabled devices, and even outlet controllers 32 that are inserted into typical electric outlets and receive devices plugged into them. Such outlet controllers 32 control whether power from the outlet is delivered to the device(s) plugged thereinto, and the outlet controller 32 in turn can be controlled in accordance with instructions received from a wireless source (such as a server 24 or the sensor apparatus 14). As such, a "dumb" device such as a traditional lamp 34 can become "smart" by being plugged in, and having its operation controlled by, an outlet controller 32.

Communication between the environmental sensor's communication apparatus 20 and the computing device(s) 22 can be accomplished by any of a variety of structures and methods. For example, a peer-to-peer communication scheme or a mesh communication scheme in which data is relayed via multiple devices until reaching a destination device via a defined wireless protocol. Communication can also be directed to a remote or local server 24, which then determines how to control specific devices, outlets, luminaires, or the like, and then communicates such control instructions. In some embodiments a wireless local area network (LAN) such as a Wi-Fi network can be employed, and the sensor apparatus 14 may communicate information and/or instructions directly to the controllers of multiple different "smart" devices.

In one relatively simple exemplary embodiment, the environmental sensor apparatus 14 determines parameters such as color and intensity of natural outdoor light and periodically communicates such parameters to a smart, LED-based luminaire 30 that includes a luminaire controller and is disposed in an indoor space 12. The luminaire controller adjusts the luminaire's color (RGB wavelength distribution and temperature in Kelvin) and intensity (Lux) output to mimic the measured parameters of the natural outdoor light. Adjustments to luminaire output occur throughout the daily cycle, preferably in real time, as measured natural light parameters change. The luminaire and sensor apparatus 14 form a system in which the luminaire controller reacts to inputs received from the sensor apparatus 14. As such, the parameters of indoor light in the indoor space 12 mimic those of the naturally-occurring outdoor light, including the gradual changing of such parameters over the course of a day. Such parameters, then, follow the naturally-occurring circadian rhythms, and the indoor space 12 environment simulates the outdoor light environment and remains in sync with natural circadian rhythms.

This principle can be employed with more complex systems employing a plurality of luminaires—including luminaires of different types and abilities. For example, with specific reference to FIG. 2, an indoor space 12 comprises a plurality of different light sources. For example, there are a plurality of overhead, ceiling-based luminaires 30 that, in the illustrated embodiment, are LED-based, have smart controllers, and are capable of near-infinite adjustment of color and intensity. An additional luminaire is a generic, "dumb" incandescent fixture 34 whose bulb emits a constant color and intensity of light. The "dumb" incandescent fixture 34 is plugged into a wall outlet via an outlet-based, IoT-enabled outlet controller 32 configured to wirelessly receive control signals. A ceiling fan 40 includes a luminaire 42 configured to be dimmable in intensity, but which has limited, if any, ability to vary the color or temperature of emitted light. The ceiling fan 40 includes "smart" technology adapted to control operation of the associated luminaire 42 and fan 40 in accordance with instructions that can be received wirelessly.

With continued reference to FIG. 2, a server 24 has access to a database describing the behavior and light parameter properties of each of these light sources, as well as its own electronic memory, processing capacity, and software for evaluating received sensor readings and developing luminaire control routines. In operation, the sensor apparatus 14 wirelessly communicates sensed outdoor lighting parameters via a wireless router to the server 24. The server 24 evaluates all of the lighting assets at its disposal, and calculates how best to employ all or some of such lighting assets to mimic the sensed parameters. Once a routine is determined by the server 24, instructions are wirelessly communicated (such as via the Wi-Fi router 28) to each luminaire controller, and the associated luminaire is operated so as to mimic the outdoor natural lighting. This may include turning the dumb incandescent fixture 34 on or off (via the outlet controller), operating the ceiling fan luminaire 42 at a selected dimming setting, and also operating the LED-based luminaires 30 to emit light having a color and intensity selected so that the light emitted by the multiple luminaires working collectively mimics the sensed natural outdoor light substantially in real time. As noted, some devices may be more or less adjustable than others. Thus, the ability of the system to provide illumination to the indoor space 12 that closely mimics the sensed natural outdoor illumination may vary depending on the capabilities of the available luminaires.

In some embodiments, an indoor sensor apparatus 44 measures the light color and intensity in the indoor space 12. Such sensor readings can be feedback that is communicated to the server 24, which can be configured to compare them to the outdoor sensor readings in order to evaluate how effective its control routine is at simulating the natural outdoor light. The server 24 can thus use feedback to iteratively adjust its control routine in order to increase the accuracy of the simulation.

It is to be understood that various forms of communication and control can be employed, and in some embodiments the sensor apparatus 14 may communicate directly with luminaire controllers. Also, it is to be understood that a wide variety of luminaire configurations can be employed. For example, some luminaires may be independently controlled. Other luminaires may be part of an array of luminaires that are controlled by a central controller. In such an array of luminaires, communication of instructions to the central controller can provide inputs for the array's central controller to control individual luminaires of the array so as to achieve light output goals.

These principles can be practiced in connection with a single room (i.e., indoor space 12) of a structure 10, or throughout multiple indoor spaces 12. As such, in some embodiments, regardless of which indoor space an individual may be in, the indoor lighting can be controlled to mimic the natural outdoor lighting based on sensor readings.

In some embodiments, the structure may be configured so that selected indoor spaces 12 are continuously illuminated with the mimicked lighting parameters. In additional embodiments sensors such as motion sensors turn luminaires off if a space is unoccupied. However, when an individual enters the space, and the lights are turned on, such lighting will be based on the sensed natural lighting at the time the lights come on. The same can be true in embodiments in which power to lights is manually controlled. Although lighting of the room may be actuated by an individual, the color and intensity of such light, when actuated, will be tied to the outdoor sensor readings.

In some cases individuals may have lighting needs that vary from the illumination provided by circadian lighting conditions. In a simple example, some embodiments may include one or more luminaires, such as a desk lamp, that are controlled independently. Thus, while the lighting environment in an indoor space 12 may simulate outdoor sensed lighting, the desk lamp may provide specifically-desired, highly-localized light that is not tied to environmental conditions.

Figure 3:
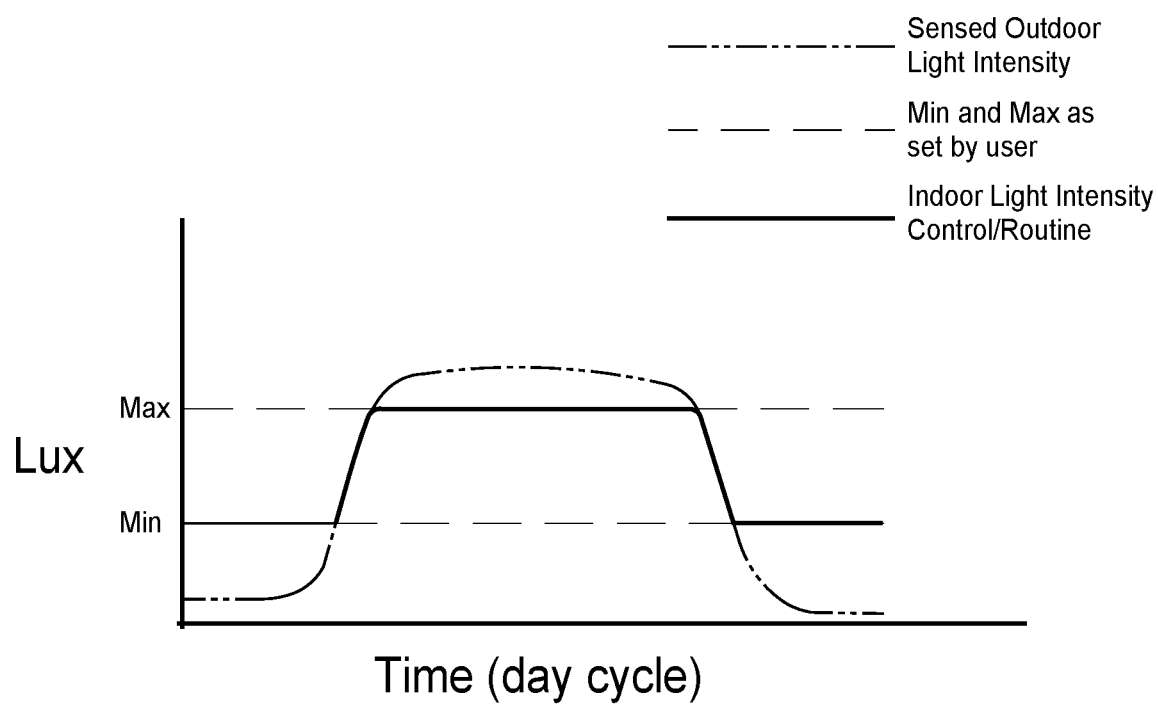
FIG. 3 is a graph showing the relationship between a sensed condition and a control routine in one embodiment.

Additionally, it may be desired to have an indoor space 12 generally follow the natural circadian cycle but with modifications to accommodate an individual's lifestyle. Thus, in some embodiments, a modulation algorithm is applied to sensed outdoor light readings in order to calculate indoor lighting controls. As such, indoor light parameters are still controlled based on sensed natural outdoor light parameters, but with modifications to accommodate a user's preferences. For example, and with reference to FIG. 3, in one embodiment, a minimum light intensity may be set, and the indoor lights will always have at least the minimum intensity when switched on—even if actuated in the middle of a dark night. Thus, the lighting setting will never be at "dark". However, when sensed outdoor intensity exceeds the minimum, the indoor intensity closely follows the sensed outdoor intensity. In this manner, natural circadian rhythms can be generally followed, but sufficient light for nighttime human activities can still be provided.

In some embodiments, the sensed color of the light at the latest instance that minimum intensity was reached will be retained as the emitted color when the luminaires are switched on during times when sensed outdoor intensity is less than the minimum intensity. In other embodiments, although the light intensity setting remains at the minimum, other light parameters, such as blue saturation, remain tied directly to sensed parameters.

In additional embodiments a hybrid control routine may be used, and the emitted color may be based on the time and the light parameters detected by the sensor apparatus 14. For example, as the light characteristics of sunlight changes through the day, all indoor luminaries will also change to replicate the same light characteristics. Instead of making changes based solely on time of day, the indoor light characteristics will also change based on cloud coverage or other factors that may change the outdoor light characteristics. When the outdoor light falls below a certain threshold of brightness such that the light characteristics can no longer be accurately measured, the indoor light can either assume a preset user preference or keep the last known light characteristics. This will help indoor users maintain their circadian rhythm and create a seamless light transition between light sourced from outside and light sourced from the indoor luminaire. As a further example, blue saturation may be decreased as it becomes later, and may increase early in the morning. Thus, in such an embodiment, if, for example, the sensed outdoor light intensity dipped below the minimum intensity at 7:00 pm, the luminaires will be controlled to maintain the minimum intensity, but the blue saturation will continue to decrease as time passes, reaching a minimum (set by user preference) at, for example, 9:30 pm. Blue saturation may remain at the minimum (even if the sensed blue saturation is less than the minimum) until 5:00 am, at which time it will be free to gradually increase with sensed blue saturation until the minimum intensity is reached, at which time all light parameters will again be controlled to mimic measured natural parameters. Of course, it is to be understood that other or additional parameters, such as the overall color/temperature of the light, can be similarly controlled. In still further embodiments, the user may be enabled to interact with the server to set a color temperature below which the indoor lighting temperature will not go.

In some embodiments it may be desired to keep indoor lighting within a certain range of intensity. In such an embodiment the lighting setting (when the room lighting is actuated) will never be at "dark", and also will never reach the full intensity of a summer sun at mid-day. With reference again to FIG. 3, a graph shows the natural outdoor light intensity over the course of a day, but also shows upper and lower limits set as a user's preferences, which preferences are saved in the system's memory. The system considers both the measured natural outdoor light and the saved user preferences in order to control indoor lighting intensity over the course of the day. As can be seen, in this embodiment the indoor lighting intensity is based on the sensed outdoor intensity, but with a modulation algorithm modulating the indoor lighting intensity so that the indoor lighting intensity mimics sensed outdoor lighting intensity only when such intensity is greater than the minimum and less than the maximum, as set by user preferences. It is to be understood that, in some embodiments, other light parameters (such as color) may NOT be so limited, but instead may slavishly follow the sensed outdoor parameters, while the intensity is modulated as depicted. Of course, such other parameters may also be modulated if so desired (and set) by the user, but perhaps with a different range and a different modulation algorithm. Nonetheless, however, even though parameters may not slavishly follow the sensed outdoor parameters, such indoor lighting parameters are still based on and mimic the sensed outdoor parameters, albeit with modulations.

Figure 4:
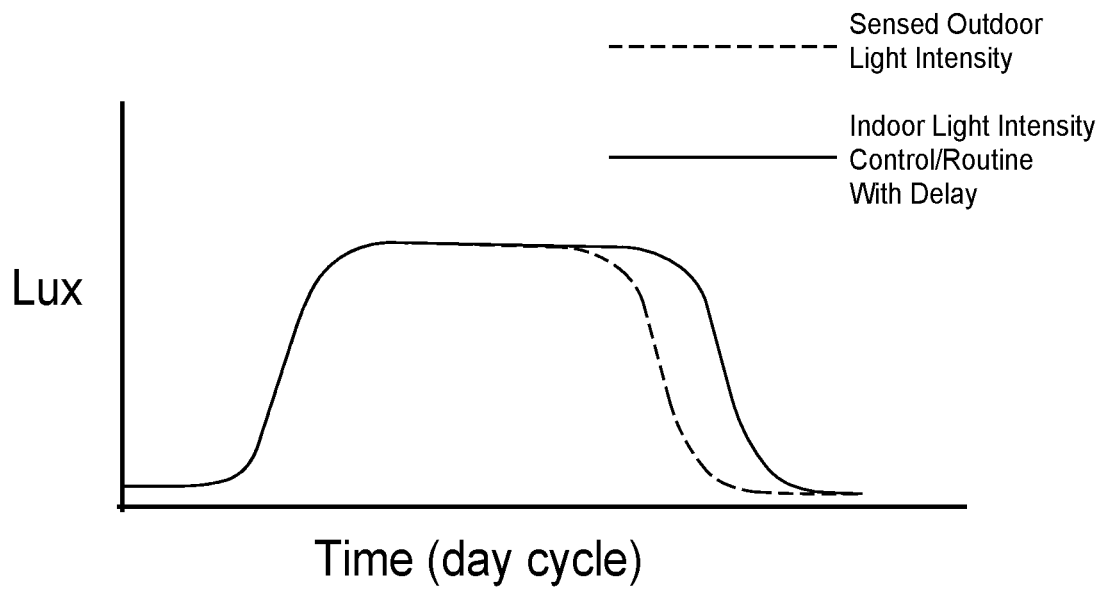
FIG. 4 is a graph showing the relationship between a sensed condition and a control routine in another embodiment.

In another embodiment, indoor lighting is controlled based on sensed natural outdoor light parameters, but with modifications to accommodate a longer period of light as typically desired by humans. In one such embodiment depicted in FIG. 4, indoor lighting is controlled to exactly mimic sensed outdoor light parameters in the morning. However, sensor readings are saved, and the system analyzes sensor readings as the day wears on. When the system determines that light intensity and/or blue saturation has peaked, the system will freeze indoor light parameters at the peak value and maintain such peak valves for a preset period of time (offset period) that can be saved in memory and may, in some embodiments, be modified by a user. The system will continue to receive sensor readings, and will save such in a memory. When the offset period (such as 2 hours, as selected by a user per preferences) has passed, the system will again control indoor lighting parameters to follow the sensed parameters, except control will resume based on the time that indoor light parameters were frozen (i.e., at the peak values). As such, indoor light parameters are still controlled based on sensed natural outdoor light parameters, but a delay equivalent to the offset period is included in order to extend the lighted part of the day.

It is to be understood that such control algorithms can be multi-faceted, and different parameters can be controlled independently. For example, the time that the maximum value of intensity occurs can be at a different time than the time that the maximum value of blue light intensity occurs, and the control may track a delay for these two parameters (or any other desired parameters) separately, or one or the other—or yet another—of the parameters may be the trigger for the offset period.

In yet another embodiment, a user may be able to set preferences for a time for dawn and a time for dusk, in addition to or instead of other preferences. A user may wish to do this in order to maintain a consistent indoor space lighting period notwithstanding the actual outdoor lighting day. In one such embodiment, the system may control illumination of the indoor space 12 by using saved environmental parameters from the same or an earlier day. For example, if the set time for dawn is before the actual dawn, the system will control indoor space illumination based on outdoor sensor data from the previous day. If, however, the set time for dawn is after the actual dawn, outdoor sensor data from the present day can be used to develop control of the indoor space illumination. A similar concept can be employed for dusk, as well as for calculating an offset period, if relevant. Additionally, the system may reference sensor data from the previous day to estimate the actual dawn or dusk and compare it to the user-set dawn and dusk so as to develop a routine and select a data set for determining indoor space illumination.

With reference again to FIGS. 1 and 2, in additional embodiments, the sensor apparatus 14 is configured to detect and measure additional outdoor environmental conditions such as, for example, temperature, humidity, wind characteristics, precipitation, sounds, scents and the like. Such sensed environmental conditions can be communicated to a server or other controller, which can control various systems based on the sensed conditions in order to mimic the sensed outdoor conditions in the indoor environment. The principles discussed above in connection with sensed natural light parameters also can be applied in connection with sensed environmental conditions/parameters. For example, a server 24 may direct an HVAC controller 50 to control an air conditioner 52 or heater 54 to mimic sensed outdoor temperatures; may direct a humidifier 56 having a "smart" controller to control indoor humidity to mimic sensed outdoor humidity; may direct a ceiling fan 40, whole-house fan 58, and/or other fan devices to operate so as to mimic sensed outdoor wind conditions, including gusting; and may direct an audio system to play sounds to mimic or simulate the sound of rainfall, when relevant, and/or to simulate other outdoor sounds such as wind blowing through tree leaves, animal noises or the like.

It is to be understood that, as with lighting effects, indoor environmental parameters can be modulated. As such, while such environmental parameters may be based on and mimic the natural sensed parameters, in some embodiments one or more of such parameters is limited to a range of performance. For example, user preferences may dictate that indoor temperatures never depart from a range of—for example—64-78° F. In one embodiment, when sensed outdoor temperatures are within that range, the indoor temperature will follow the sensed outdoor temperature but will not exceed the range maximum or dip below the range minimum. In additional embodiments a modulation algorithm can be applied to the sensed outdoor temperatures. As such, while the indoor temperature will not follow the actual sensed outdoor temperature, the indoor temperature will be controlled to follow the rise and fall pattern of the sensed outdoor temperature, but in a muted manner and limited to the user-specified range. Thus, indoor conditions can mimic outdoor conditions, but remain within a desired range of comfort. Similarly, while the system may simulate a gust of wind, such simulation may purposely be of moderate impact, preserving both comfort and order within the indoor space 12. In some embodiments, in addition to or instead of user-set maximums and minimums, users can set periods of "on" and "off", for various outdoor parameters. For example, a user may wish to have outdoor sounds simulated in the indoor space 12 during the day, but have this feature turned off from 8 pm to 7 am.

In another embodiment, lighting operation of a screened computing device, such as a tablet, mobile phone 26, laptop or desktop computer, or the like, or even a television, can be controlled based on sensed outdoor lighting parameters. As is known, typical electronic display screens often are backlit and display images and information, often with great vibrancy and precision. In a preferred embodiment the backlight parameters of the screen display will be controlled using a control routine based on sensed outdoor lighting parameters. Of course, actual lighting of the display, and its ability to display detailed images, typically requires more colors than just the basic outdoor light color. However, such sensed outdoor light parameters can be included in a modulation algorithm that modulates the displayed screen image to approximate how the subject matter of a displayed image might appear in the outdoors. And more specifically, parameters such as blue saturation in the screen backlight or even in affirmatively-displayed images, can follow—even in a modulated way—the corresponding sensed blue light saturation of the sensed outdoor light. As such, one could expect blue-light saturation of a screen display in the evening or night to have very little blue-light saturation, and also decreased intensity.

In still another embodiment, a mobile computing device can be controlled based on a sensor apparatus 14 remotely placed indoors or outdoors. For example, if an individual is away from home and will soon be travelling back home, the individual may wish to get a head start in recovering from jet lag. Such user can tie their mobile phone to their home outdoor sensor apparatus 14, and the mobile phone will adjust its blue saturation to match that of the sensed light at home. The user thus can begin working on transitioning their circadian rhythm to an at-home circadian rhythm before travelling home, thus shortening the jet lag experience. In some embodiments, such a user could also get a head start in avoiding or minimizing jet lag for an upcoming trip, by tying their phone, laptop, or even home lighting system to an outdoor sensor apparatus 14 located at the travel destination in order to being transitioning their circadian rhythms to the destination's light patterns.

In illustrated embodiments the sensor apparatus 14 has been depicted as located on the same structure that encloses the indoor space 12 that is controlled based on sensor readings. It is to be understood that, in additional embodiments, the sensor apparatus 14, or parts of the sensor apparatus, may be disposed remotely. For example, a light sensor 15 (or an array of light sensors) can be placed atop one or more nearby structures (such as street lights) that are sufficiently tall to avoid being shaded by other structures or trees. Such sensor(s) can transmit light measurements directly to the controllers and/or to a remote server 24 that can communicate with the indoor controllers, such as over a network. In this manner, the remote light sensor(s) can be dedicated to a single structure or, if desired, serve multiple systems distributed through an entire neighborhood, city, or other geographic area. Additional embodiments can include hybrid systems, in which indoor environmental control instructions are based on both remote sensor readings (such as light sensors on a tall structure in the neighborhood) and highly localized sensor readings (such as an additional light sensor, sound sensor, or humidity sensor located on the structure 10 being controlled). Multiple light sensor readings can be averaged or otherwise processed as desired.

In still additional embodiments, sensor readings can be processed by one or more computing devices 22 so as to mute the effect of short-term events. For example, once a light intensity is determined to reach a level indicating it is daytime, light readings over a period of time (such as 10 minutes to 1 hour) can be averaged so as to minimize the effect of transitional events, such as shade from a passing cloud. And in further embodiments the computing device may perform a statistical analysis to identify outlier events (such as a sudden, brief gust of wind detected by a wind sensor), and remove such outlier events from the calculation of averages.

The embodiments discussed above have disclosed structures and methods with substantial specificity. This has provided a good context for disclosing and discussing inventive subject matter. However, it is to be understood that other embodiments may employ different specific structural shapes and interactions. Also, the principles discussed in connection with one embodiment should be considered to possibly be applicable to other embodiments. Specifically, it is contemplated that principles discussed in connection with lighting parameters can also be applicable in embodiments dealing with environmental parameters, and vice versa. Similarly, principles discussed in connection with controlling lighting parameters of a device having an electronic display screen can also be applicable to embodiments dealing with lighting parameters of a structure, and vice versa.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A system, comprising:
    a sensor apparatus configured to detect one or more natural outdoor light parameters;
    at least one luminaire configured to emit light, the at least one luminaire configured so that at least one of a color and an intensity of the emitted light is adjusted;
    a controller configured to receive a sensor data comprising information about the at least one natural outdoor light parameters as detected by the sensor apparatus, the controller configured to selectively adjust the color and/or intensity of emitted light from the luminaire; and
    a communication apparatus configured to communicate the sensor data concerning the natural outdoor light parameters to the controller;
    wherein the controller is configured to adjust the color and/or intensity of emitted light from the luminaire based on the data concerning the natural outdoor light parameters.

2. The system of claim 1, wherein the controller is configured to adjust the color and/or intensity of emitted light from the luminaire to mimic the natural outdoor light parameters.

3. The system of claim 1, wherein the sensor apparatus is configured to detect at least one outdoor environmental condition other than light, and wherein the controller is configured to receive a data concerning the at least one outdoor environmental condition and to control an indoor environmental condition apparatus based on the data concerning the at least one outdoor environmental condition.

4. The system of claim 1, further comprising a feedback sensor apparatus configured to detect at least one indoor light parameter, wherein the controller is further configured to receive feedback sensor data comprising information about the at least one indoor light parameter as detected by the feedback sensor apparatus.

5. The system of claim 4, wherein the sensor apparatus is placed in an outdoor location, and the luminaire and the feedback sensor apparatus are placed in an indoor space, and the at least one indoor light parameter reflects conditions within the indoor space.

6. The system of claim 1, wherein the controller is further configured to adjust a color of the emitted light from a display screen of a computing device.

7. The system of claim 6, wherein the computing device is a tablet or mobile phone.

8. A method of performing environmental control of an indoor space, comprising:
  detecting one or more natural outdoor light parameters;
  saving a sensor data concerning the detected one or more natural outdoor light parameters;
  developing a control routine based on the sensor data, the control routine configured to control one or more luminaires within the indoor space so that one or more indoor space light parameters in the indoor space mimic the detected one or more natural outdoor light parameters; and
  repeatedly updating the sensor data and control routine over time as the one or more natural outdoor light parameters change so that the one or more indoor space light parameters correspondingly change.

9. The method of claim 7, additionally comprising receiving and saving one or more user preferences, and wherein the control routine is configured to control the one or more luminaires within the indoor space so that the one or more indoor space light parameters in the indoor space mimic the detected one or more natural outdoor light parameters subject to the user preferences.

10. The method of claim 8, additionally comprising maintaining the one or more indoor space light parameters at a selected setting for an offset period of time.

11. The method of claim 9, additionally comprising, after the offset period of time passes, controlling the one or more luminaires so that the one or more indoor space light parameters in the indoor space mimic the one or more natural outdoor light parameters detected an offset period of time prior.

12. The method of claim 7, wherein the one or more luminaires is controlled to maintain light intensity within the indoor space above a minimum level when actuated notwithstanding the contemporaneously detected natural outdoor light intensity.

13. The method of claim 11, additionally comprising controlling the one or more luminaires so that the blue saturation within the indoor space mimics the contemporaneously detected natural outdoor blue saturation.

* * * * *